United States Patent
Yuan et al.

(10) Patent No.: US 9,571,024 B1
(45) Date of Patent: Feb. 14, 2017

(54) MULTIPHASE MOTOR GENERATOR SYSTEM AND CONTROL METHOD THEREOF

(71) Applicant: Caterpillar Inc., Peoria, IL (US)

(72) Inventors: Chen Yuan, Columbus, OH (US); Krishnakumar Dharapuram Ramamoorthy, Peoria, IL (US); Osama Mohammad Alkhouli, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 14/987,987

(22) Filed: Jan. 5, 2016

(51) Int. Cl.
*H02P 27/08* (2006.01)
*H02P 21/00* (2016.01)

(52) U.S. Cl.
CPC ......... *H02P 21/0035* (2013.01); *H02P 27/08* (2013.01)

(58) Field of Classification Search
CPC .................. H02P 21/0035; H02P 27/08
USPC .......................................... 318/801
See application file for complete search history.

(56) References Cited

U.S. PATENT DOCUMENTS

| | | |
|---|---|---|
| 1,418,779 A | 6/1922 | Creedy |
| 5,019,766 A | 5/1991 | Hsu et al. |
| 5,650,707 A | 7/1997 | Lipo et al. |
| 5,977,679 A | 11/1999 | Miller et al. |
| 6,008,616 A | 12/1999 | Nagayama et al. |
| 6,456,033 B1 | 9/2002 | Nishimura |
| 7,679,311 B2 | 3/2010 | Sopko et al. |
| 7,928,683 B2 | 4/2011 | Edelson |
| 8,779,702 B2 | 7/2014 | Si et al. |
| 2004/0100222 A1* | 5/2004 | Karikomi ............ H02P 6/185 318/801 |
| 2007/0069681 A1* | 3/2007 | Imura ............ H02P 6/182 318/717 |
| 2008/0297085 A1* | 12/2008 | Lee ............ H02P 21/0085 318/434 |
| 2010/0090640 A1* | 4/2010 | Maekawa ............ H02K 1/276 318/701 |

FOREIGN PATENT DOCUMENTS

| | | |
|---|---|---|
| JP | 2001-304001 | 10/2001 |
| JP | 2005-006400 | 1/2005 |

* cited by examiner

*Primary Examiner* — Kawing Chan
(74) *Attorney, Agent, or Firm* — Miller, Matthias & Hull LLP

(57) ABSTRACT

A multiphase motor generator system includes a multiphase induction motor having a plurality of separate terminals, a multiphase inverter coupled to a DC link voltage source and the plurality of terminals of the multiphase induction motor, a plurality of current detectors configured to detect a plurality of currents that flow between the multiphase inverter and the plurality of terminals of the multiphase induction motor, and a controller coupled to the current detectors and the multiphase inverter, and configured to receive the detected currents and output a plurality of control voltages to the multiphase inverter. The controller includes a multiphase to direct-quadrature (dq) conversion unit, a dq equivalent unit, a dq to multiphase conversion unit, and a pulse-width-modulator (PWM) converter.

17 Claims, 7 Drawing Sheets

MULTIPHASE MOTOR GENERATOR SYSTEM AND CONTROL METHOD THEREOF

TECHNICAL FIELD

The present disclosure relates generally to a multiphase induction motor generator system and, more particularly, to a multiphase induction motor generator system and a control method for controlling the multiphase induction motor generator system.

BACKGROUND

Machines, such as, for example, track-type tractors and other off-highway vehicles including construction, agriculture, and mining machines, are used to perform many tasks. To effectively perform these tasks, such machines require a power source that provides significant power to a drive system. The power source may be an engine such as, for example, a turbine engine, diesel engine, gasoline engine, or natural gas engine operated to generate a torque output at a range of speeds. This torque is typically provided to one or more traction devices via a transmission operably connected to the engine via the drive system.

To start such machines, a starter motor with the capability of generating a large amount of torque at low speeds is needed. Often the amount of electrical power required to operate a starter motor for a relatively short period of time can significantly drain the available power in a portable energy storage device such as a battery. In order to maintain sufficient power in the battery for multiple starts of the power source, an electrical generator such as an alternator is often provided to generate the electrical power needed to recharge the battery. If an induction motor is used as both a starter motor and as an alternator to generate electrical power, the induction motor must be able to operate at lower speeds and higher torque when starting the machine, and at higher speeds and lower torque while still generating sufficient power in its capacity as an alternator or generator.

An exemplary induction motor used as both a starter and an alternator is described in U.S. Pat. No. 5,977,679 (the '679 patent) issued to Miller et al. on Nov. 2, 1999. The '679 patent describes an induction motor including a stator having a cylindrical core with a plurality of inner and outer slots and a plurality of toroidal coils wound about the core and laid in the inner and outer slots.

The design of the induction motor in the '679 patent is said to enable arbitrary combination of the number of poles and phases of the motor, thus allowing for smooth torque operation in the alternator mode.

Although the induction motor disclosed in the '679 patent may provide some advantages in allowing an induction motor to be used in both a starter mode and as an alternator, the motor still experiences a variety of drawbacks. For example, in order for the induction motor in the '679 patent to transition from engine cranking to alternator mode, the number of phases must be changed to accommodate a change in a number of poles. This required change in the number of phases also results in a significant increase in the electronic complexity of an inverter that is connected to the coils of the motor to allow multiphase operation.

The disclosed systems and methods are directed to overcoming one or more of the problems set forth above.

SUMMARY

In one aspect, this disclosure is directed to a multiphase motor generator system. The system includes a multiphase induction motor having a plurality of separate terminals, a multiphase inverter coupled to a DC link voltage source and the plurality of terminals of the multiphase induction motor, a plurality of current detectors configured to detect a plurality of currents that flow between the multiphase inverter and the plurality of terminals of the multiphase induction motor, and a controller coupled to the current detectors and the multiphase inverter, and configured to receive the detected currents and output a plurality of control voltages to the multiphase inverter. The controller includes a multiphase to direct-quadrature (dq) conversion unit configured to convert the plurality of currents into a direct-axis (d-axis) current value $I_d$ and a quadrature-axis (q-axis) current value $I_q$ in a rotating reference system, a dq equivalent unit configured to determine a d-axis voltage command value $V^*_d$ and a q-axis voltage command value $V^*_q$ based on the d-axis current value $I_d$ and the q-axis current value $I_q$, a dq to multiphase conversion unit configured to convert the d-axis voltage command value $V^*_d$ and the q-axis voltage command value $V^*_q$ into a plurality of command voltages, and a pulse-width-modulator (PWM) converter configured to convert the plurality of command voltages to the plurality of control voltages.

In another aspect, this disclosure is directed to a controller for controlling a multiphase inverter that supplies power to a multiphase induction motor. The controller includes a processor and a non-transitory memory configured to store instructions that, when executed, enable the processor to obtain data representing a plurality of currents that flow between the multiphase inverter and the multiphase induction motor, convert the plurality of currents into a direct-axis (d-axis) current value $I_d$ and a quadrature-axis (q-axis) current value $I_q$ in a rotating reference system, generate a d-axis voltage command value $V^*_d$ and a q-axis voltage command value $V^*_q$ based on the d-axis current value $I_d$ and the q-axis current value $I_q$, convert the d-axis voltage command value $V^*_d$ and the q-axis voltage command value $V^*_q$ into a plurality of command voltages, and convert the plurality of command voltages to the plurality of control voltages.

In yet another aspect, this disclosure is directed to a method for controlling a multiphase inverter that supplies power to a multiphase induction motor. The method includes detecting a plurality of currents that flow between the multiphase inverter and the multiphase induction motor, converting the plurality of currents into a direct-axis (d-axis) current value $I_d$ and a quadrature-axis (q-axis) current value $I_q$ in a rotating reference system, generating a d-axis voltage command value $V^*_d$ and a q-axis voltage command value $V^*_q$ based on the d-axis current value $I_d$ and the q-axis current value $I_q$, converting the d-axis voltage command value $V^*_d$ and the q-axis voltage command value $V^*_q$ into a plurality of command voltages, converting the plurality of command voltages to the plurality of control voltages, and applying the plurality of control voltages to the multiphase inverter.

DETAILED DESCRIPTION

Figure 1:
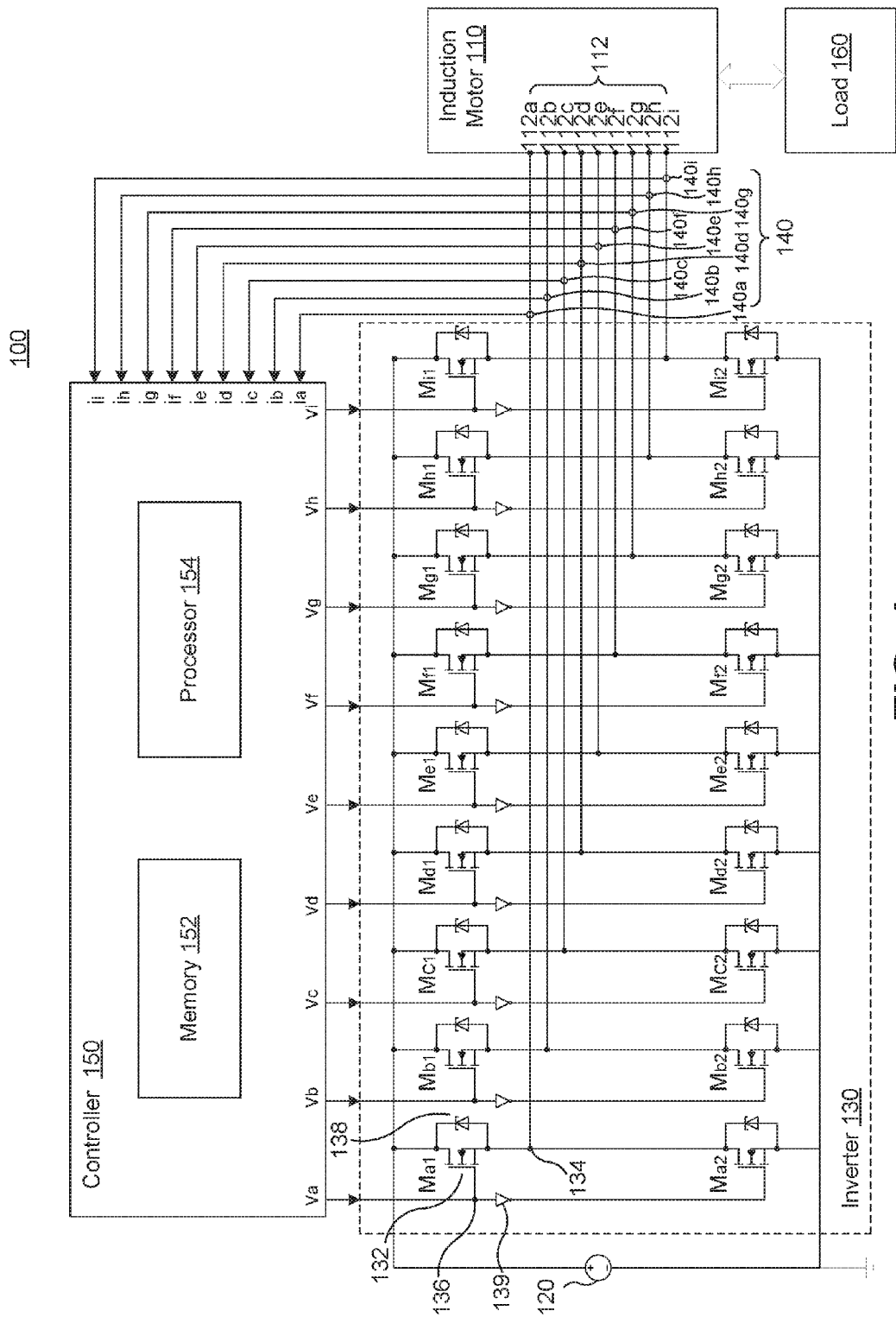
FIG. 1 is a diagrammatic illustration of a multiphase motor generator system, consistent with a disclosed embodiment.

FIG. 1 is a diagrammatic illustration of a multiphase motor generator system 100, consistent with a disclosed embodiment. Multiphase motor generator system 100 includes an induction motor 110, a DC source 120, an inverter 130, a plurality of current detectors 140, and a controller 150.

Induction motor 110 may be a multiphase motor including a plurality of separate terminals 112 for receiving power. Induction motor 110 may be configured to selectively function as a starter motor and a generator motor in a machine. Generally, a starter motor receives electrical power and generates a large amount of torque at low speeds to drive a load 160 when, for example, starting the machine. A generator motor generates electrical power at higher speeds and lower torque. The machine in which induction motor 110 may be used could include any machine that performs some type of operation associated with an industry such as mining, construction, farming, transportation, or any other industry known in the art. In the embodiment illustrated in FIG. 1, induction motor 110 may be a nine-phase induction motor including nine (9) separate terminals 112a, 112b, . . . , and 112i respectively corresponding to nine phases of induction motor 110. Detailed description of induction motor 110 will be provided with reference to FIGS. 2 and 3.

DC source 120 may be a rechargeable battery providing a DC link voltage of, for example, 100 volts (V). For example, DC source 120 may be a lithium-ion battery or a nickel-metal hydride battery.

Inverter 130 may be coupled between induction motor 110 and DC source 120. Inverter 130 may be configured to convert the DC link voltage provided by DC source 120 into a plurality of currents that are communicated to induction motor 110 to drive induction motor 110. In the embodiment illustrated in FIG. 1, inverter 130 may be a 9-phase inverter 130 that is configured to convert the DC link voltage into nine (9) currents $i_a, i_b, \ldots,$ and $i_i$, and apply the nine currents to respectively corresponding terminals 112a, 112b, . . . , and 112i of induction motor 110.

Inverter 130 may include a plurality of pairs of switching elements 132 coupled between DC source 120 and corresponding ones of terminals 112 of induction motor 110. Each pair of switching elements 132 may be connected in series between a positive terminal and a negative terminal of DC source 120. A connection point 134 between each pair of switching elements 132 may be connected to a corresponding terminal 112 of induction motor 110. Each switching element 132 may include a control terminal 136 configured to receive a control voltage from controller 150. A diode 138 may be connected in reverse to each switching element 132. An inverter 139 may be connected between the control terminals 136 of each pair of switching elements 132.

In the embodiment illustrated in FIG. 1, inverter 130 may include nine pairs of switching elements 132, i.e., Ma1 and Ma2, Mb1 and Mb2, . . . , and Mi1 and Mi2. For example, switching elements Ma1 and Ma2 may be connected in series, and a connection point 134 between switching elements Ma1 and Ma2 may be connected to terminal 112a of induction motor 110. As another example, switching elements Mb1 and Mb2 may be connected in series, and a connection point 134 between switching elements Mb1 and Mb2 may be connected to terminal 112b of induction motor 110.

In the embodiment illustrated in FIG. 1, switching element 132 may be a metal-oxide-semiconductor field-effect transistor (MOSFET). However, switching element 132 may be any type of switching device, such as an insulated gate bipolar transistor (IGBT).

The plurality of current detectors 140 may be coupled between inverter 130 and induction motor 110 and are configured to detect the plurality of currents that flow between inverter 130 and induction motor 110, respectively. In the embodiment illustrated in FIG. 1, current detectors 140 includes current detectors 140a, 140b, . . . , and 140i that measure the nine currents $i_a, i_b, \ldots,$ and $i_i$, respectively. Current detectors 140 may transmit data representing the measured currents to controller 150.

Controller 150 may include digital logic configured to interact with and control certain components of inverter 130. The digital logic may include discrete logic components, programmable logic devices and/or general purpose computer processors such as microcontrollers or microprocessors. In the embodiment illustrated in FIG. 1, controller 150 may include a non-transitory memory 152 configured to store computer program instructions and a processor 154 configured to execute the computer program instructions stored in memory 152 to receive data representing the currents measured by current detectors 140, generate a plurality of control voltages based on the measured currents, and apply the control voltages to inverter 130. In the embodiment illustrated in FIG. 1, controller 150 may generate control voltages $v_a, v_b, \ldots,$ and $v_i$ based on the nine currents $i_a, i_b, \ldots,$ and $i_i$, that are measured by current detectors 140a, 140b, . . . , and 140i, respectively. Controller 150 may be configured to apply control voltages $v_a, v_b, \ldots,$ and $v_i$ to control terminals 136 of switching elements 132. As a result, the control terminals 136 of switching elements Ma1, Mb1, . . . , and Mi1 receive control voltages $v_a, v_b, \ldots,$ and $v_i$, respectively. Due to the existence of inverters 139, the control terminals 136 of switching elements Ma2, Mb2, . . . , and Mi2 receive inversions of control voltages $v_a, v_b, \ldots,$ and $v_i$, respectively.

Although not illustrated in FIG. 1, multiphase motor generator system 100 may include a voltage detector for detecting the DC link voltage provided by DC source 120, and a speed detector for detecting a rotation speed of induction motor 110. In addition, controller 150 may include an upper level controller for controlling controller 150 to operate in a starter mode and a generator mode controller. When controller 150 operates in the starter mode, the upper level controller provides a target rotation speed to be achieved by induction motor 110, and controller 150 controls inverter 130 according to the target rotation speed. When controller 150 operates in the generator mode, the upper level controller provides a target DC link voltage, and controller 150 controls inverter 130 according to the target DC link voltage. Detailed description of controller 150 will be provided with reference to FIGS. 4 and 5.

Figure 2:
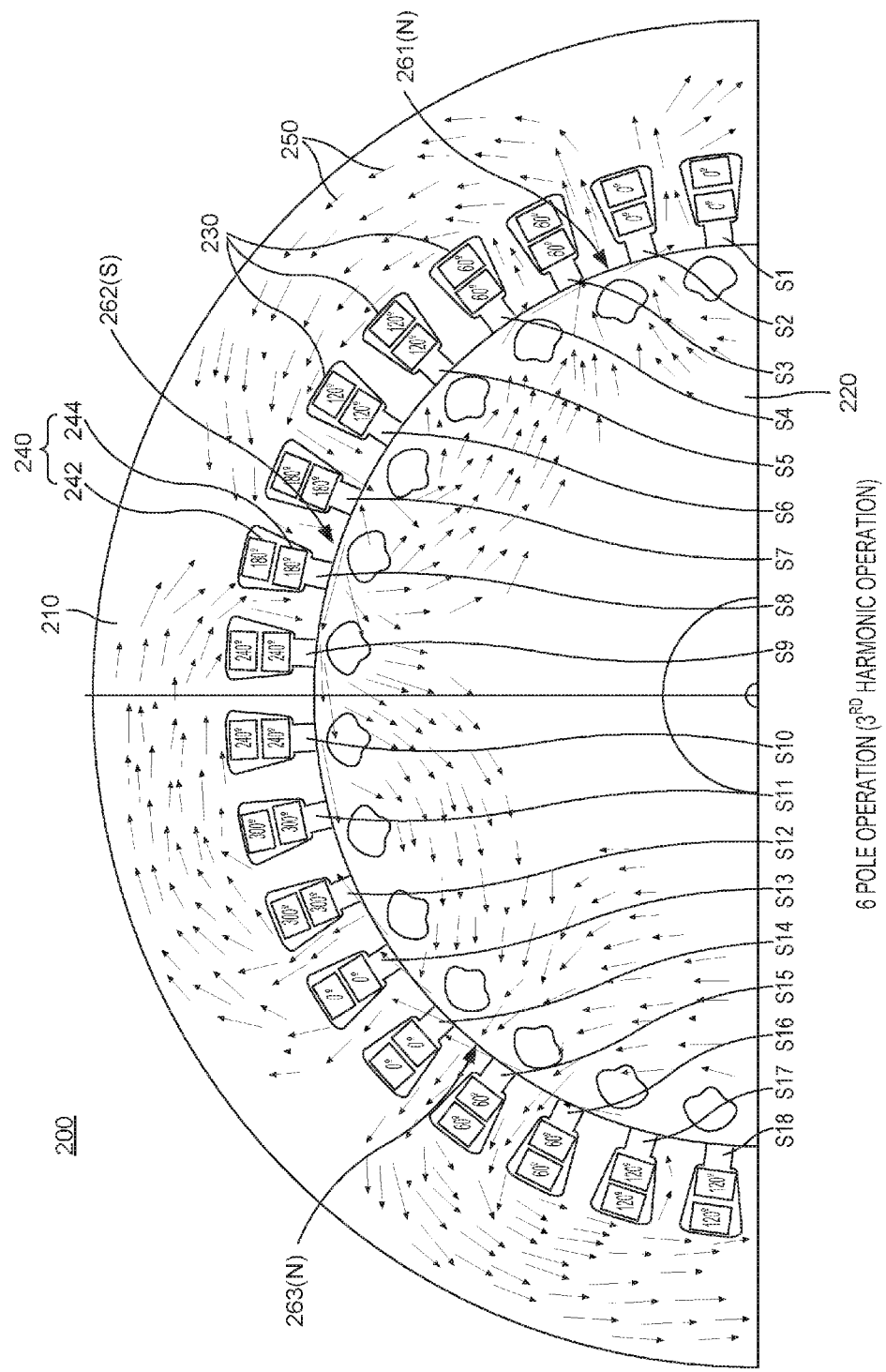
FIG. 2 is a diagrammatic illustration of one half of an induction motor operating as a starter, consistent with a disclosed embodiment.

FIG. 2 is a diagrammatic illustration of one half of an induction motor 200 operating as a starter, consistent with a disclosed embodiment. Induction motor 200 may include an annular stator 210 and a rotor 220 rotatably mounted inside stator 210. Stator 210 includes thirty-six (36) circumferentially spaced slots 230, half of which are shown in FIG. 2, and labeled as S1, S2, ..., and S18. Windings 240 may be installed within slots 230 and may be configured to receive the plurality of currents provided by inverter 130 illustrated in FIG. 1. Each winding 240 is installed to form a top layer winding 242 that passes into (in a direction that is into the page of FIG. 2) a radially outer portion of a first slot, and a bottom layer winding 244 that passes out of (in a direction that is out of the page of FIG. 2) a radially inner portion of a second slot that is located 60 degrees away from the first slot. Each of the nine currents $i_a$, $i_b$, ..., and $i_i$ provided by inverter 130 flows into a pair of adjacent top layer windings 242 and out of a pair of adjacent bottom layer windings 244, or flows out of a pair of adjacent top layer windings 242 and into a pair of adjacent bottom layer windings 244. For example, first current $i_a$ flows into top layer windings 242 in radially outer portions of slots S1 and S2, and out of bottom layer windings 244 in radially inner portions of slots S7 and S8. As another example, second current $i_b$ flows out of top layer windings 242 in radially outer portions of slots S3 and S4, and into bottom layer windings 244 in radially inner portions of slots S9 and S10. One of ordinary skill in the art will recognize that the number of slots in the stator and the number of winders may vary in accordance with the number of phases of the induction motor.

In the embodiment illustrated in FIG. 2, the plurality of currents received by induction motor 200 have a third harmonic frequency of a current drive waveform. That is, the frequency of the plurality of currents supplied by inverter 130 is three times a fundamental frequency of the current drive waveform. Hereinafter, the plurality of currents having the third harmonic frequency are referred to as "third harmonic currents." As a result, induction motor 200 generates magnet flux represented by directed lines 250 (hereinafter referred to as "magnetic flux 250") illustrated in FIG. 2. Magnet flux 250 results in six (6) magnetic poles with opposite polarities, half of which are shown in FIG. 2, and labeled as 261(N) representing a north pole, 262(S) representing a south pole, and 263(N) representing a north pole. A larger number of poles results in a larger amount torque generated by induction motor 200. Accordingly, induction motor 200 having the six magnetic poles generates a relatively large amount of torque.

Figure 3:
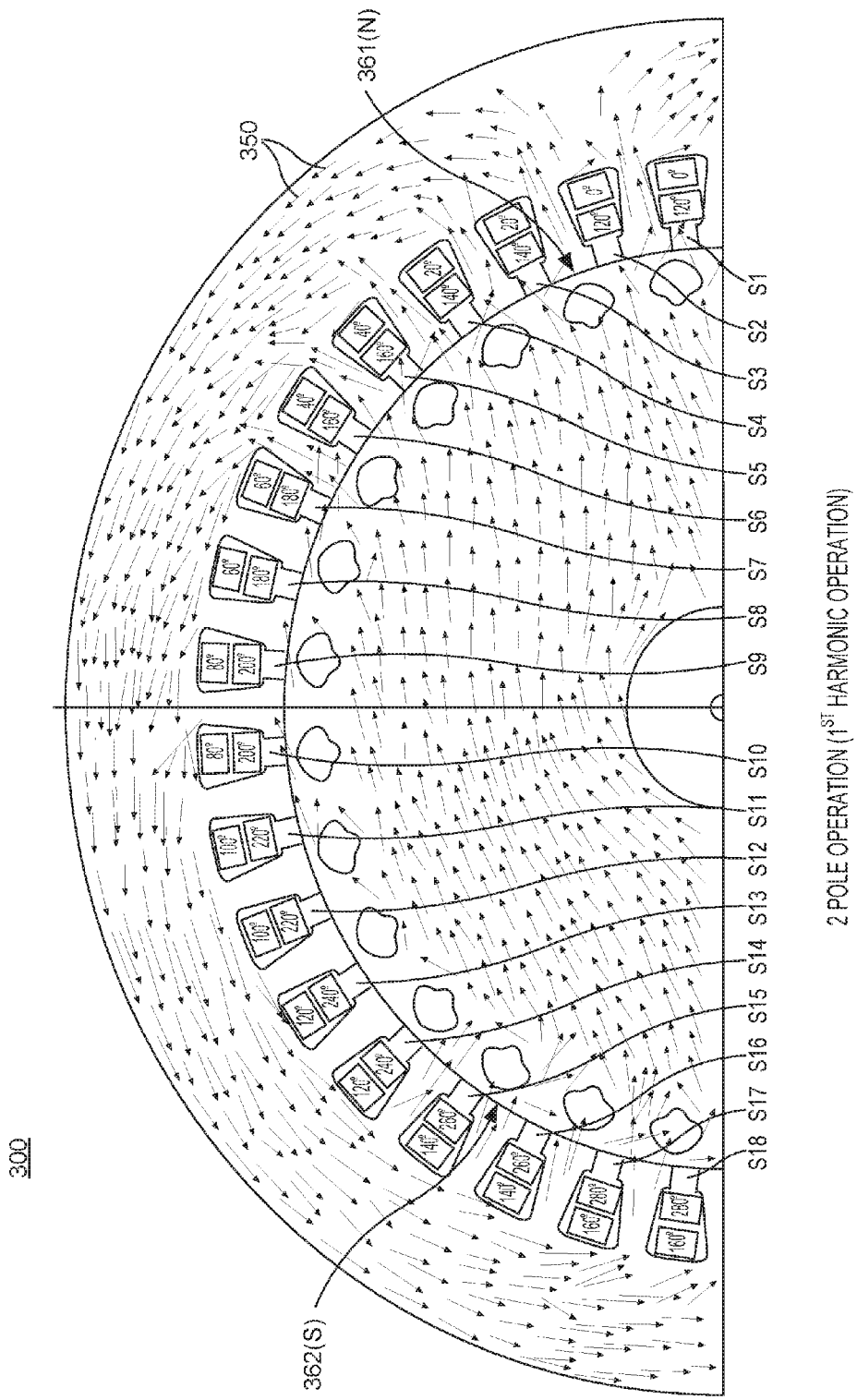
FIG. 3 is a diagrammatic illustration of one half of an induction motor operating as a generator, consistent with a disclosed embodiment.

FIG. 3 is a diagrammatic illustration of one half of an induction motor 300 operating as a generator, consistent with a disclosed embodiment. Induction motor 300 has a structure similar to that of induction motor 200 illustrated in FIG. 2. One distinction between induction motor 300 and induction motor 200 is that the plurality of currents received by induction motor 300 have a first harmonic frequency of the current drive wave form. That is, the frequency of the plurality of currents supplied by inverter 130 is the fundamental frequency of the current drive wave form. Hereinafter, the plurality of currents having the first harmonic frequency are referred to as "first harmonic currents." As a result, induction motor 300 generates magnet flux 350, which results in two (2) magnetic poles with opposite polarities, which area shown in FIG. 3 and labeled as 361(N) representing a north pole and 362(S) representing a south pole. A smaller number of poles results in a smaller amount torque generated by induction motor 300. Accordingly, induction motor 300 having the two magnetic poles generates a relatively small amount of torque.

Figure 4:
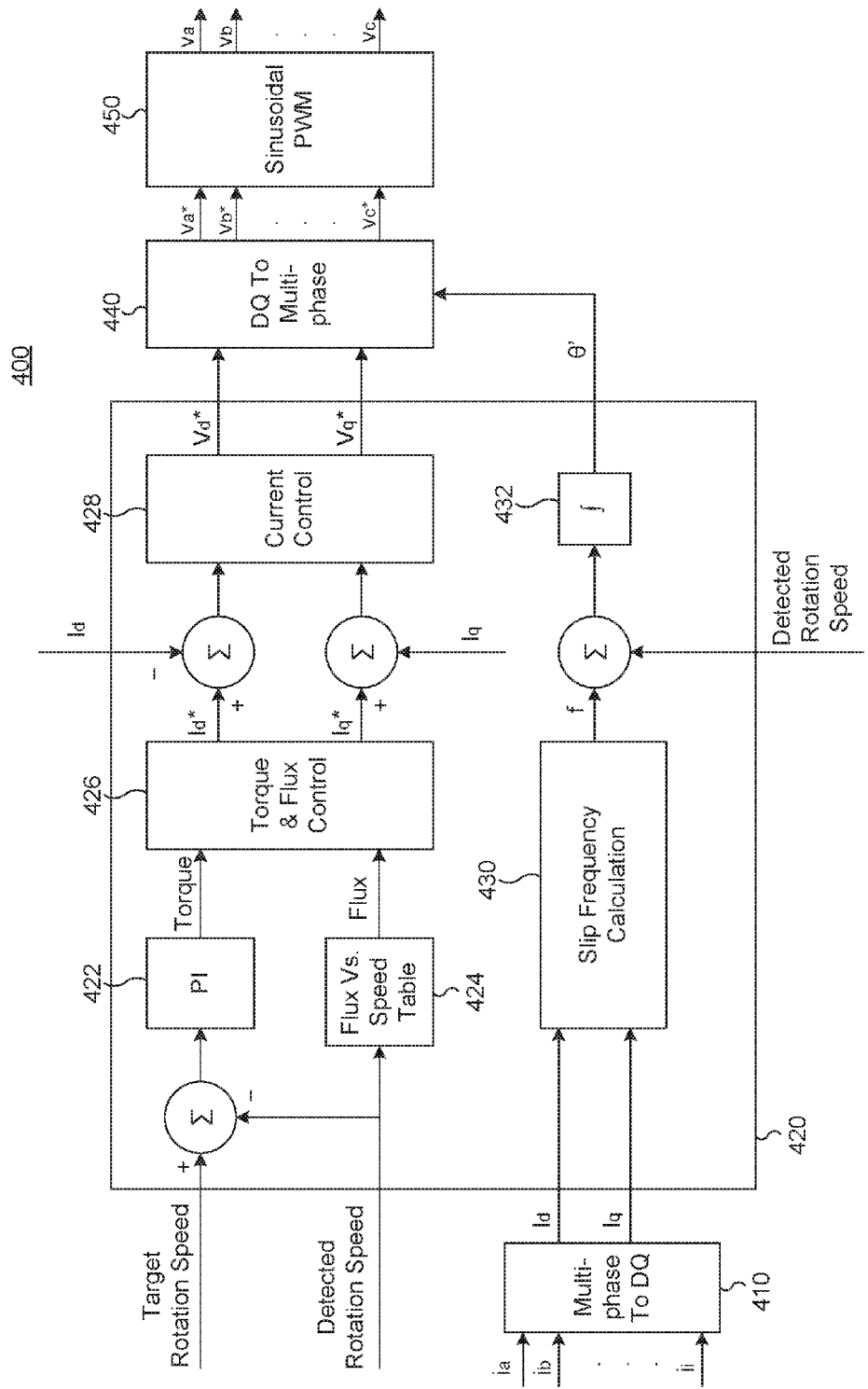
FIG. 4 is a block diagram showing components of a starter mode controller, consistent with a disclosed embodiment.

FIG. 4 is a block diagram showing components of a controller 400 operating in the starter mode (hereinafter referred to as "starter mode controller 400"), consistent with a disclosed embodiment. Starter mode controller 400 may include a multiphase to direct-quadrature (dq) conversion unit 410, a dq equivalent unit 420, a dq to multiphase conversion unit 440, and a sinusoidal pulse-width-modulator (PWM) conversion unit 450.

Multiphase to dq conversion unit 410 may be configured to convert the plurality of currents measured by current detectors 140 in a stationary reference system into a direct-axis (d-axis) current value $I_d$ and a quadrature-axis (q-axis) current value $I_q$ in a rotating reference system. In the embodiment illustrated in FIG. 4, multiphase to dq conversion unit 410 may convert the nine currents $i_a$, $i_b$, ..., and $i_i$ into the d-axis current value $I_d$ and the q-axis current value $I_q$. Detailed description of a method for converting the plurality of currents into the d-axis current value $I_d$ and the q-axis current value $I_q$ will be provided with reference to FIG. 6. In the embodiments described below, the nine currents $i_a$, $i_b$, ..., and $i_i$ may be stator currents (i.e., currents that flow into the stator of induction motor 110). Alternatively, the nine currents $i_a$, $i_b$, ..., and $i_i$ may be rotor currents (i.e., currents that flow into the rotor of induction motor 110).

Dq equivalent unit 420 may be configured to determine a d-axis voltage command value $V^*_d$ and a q-axis voltage command value $V^*_q$ based on the d-axis current value $I_d$, the q-axis current value $I_q$, a target rotation speed of induction motor 110, and a detected rotation speed of induction motor 110. In the embodiment illustrated in FIG. 4, dq equivalent unit 420 may include a proportional-integral (PI) unit 422, a flux versus speed table unit 424, a torque and flux control unit 426, a current control unit 428, a slip frequency calculation unit 430, and an integration unit 432. PI unit 422 may be configured to determine a torque command value based on a difference between the target rotation speed and the detected rotation speed. Flux versus speed table unit 424 may be configured to determine a flux command value based on the detected rotation speed. Torque and flux control unit 426 may be configured to determine a d-axis current command value $I^*_d$ and a q-axis current command value $I^*_q$ based on the torque command value and the flux command value. Current control unit 428 may be configured to determine the d-axis voltage command value $V^*_d$ and the q-axis voltage command value $V^*_q$ based on a difference between the d-axis current command value $I^*_d$ and the d-axis current value $I_d$, and a difference between the q-axis current command value $I^*_q$ and the q-axis current value $I_q$. Slip frequency calculation unit 430 may be configured to determine a slip frequency based on the d-axis current value $I_d$ and the q-axis current value $I_q$. Integration unit 432 may be configured to integrate a combination of the slip frequency and the detected rotation speed to generate an output angle θ', which represents a rotation angle between the q-axis and the α-axis at the time when dq to multiphase conversion is performed.

Dq to multiphase conversion unit 440 may be configured to convert the d-axis voltage command value $V^*_d$ and the q-axis voltage command value $V^*_q$ into a plurality of command voltages respectively corresponding to the plurality of currents in the stationary coordinate system, based on the output angle θ'. In the embodiment illustrated in FIG. 4, dq to multiphase conversion unit 440 may convert the d-axis voltage command value $V^*_d$ and the q-axis voltage command value $V^*_q$ into nine (9) command voltages $v^*_a$, $v^*_b, \ldots, v^*_i$. Detailed description of a method for converting the d-axis voltage command $V^*_d$ and the q-axis voltage command value $V^*_q$ into the plurality of command voltages will be provided with reference to FIG. 6.

Sinusoidal PWM conversion unit 450 may be configured to convert the plurality of command voltages to a plurality of control voltages by comparing the plurality of command voltages with a triangular reference waveform having a predetermined frequency. The plurality of command voltages are sine waves. The plurality of control voltages are square waves (i.e., binary waves) having a high voltage level and a low voltage level for turning on or off the plurality of switching elements 132 in inverter 130.

Figure 5:
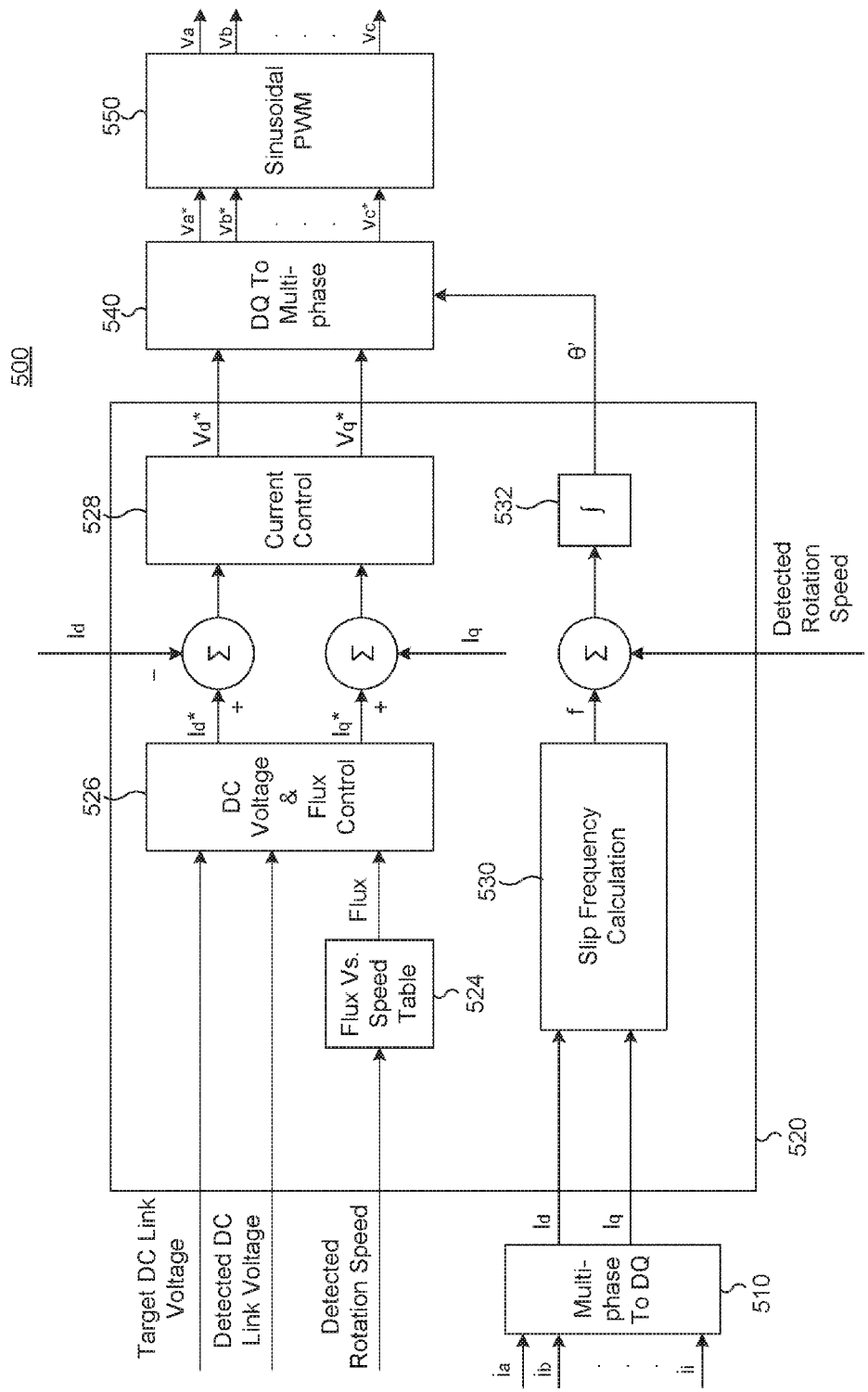
FIG. 5 is a block diagram showing components of a generator mode controller, consistent with a disclosed embodiment.

FIG. 5 is a block diagram showing components of a controller 500 operating in the generator mode (hereinafter referred to as "generator mode controller 500"), consistent with a disclosed embodiment. Generator mode controller 500 may include a multiphase to dq conversion unit 510, a dq equivalent unit 520, a dq to multiphase conversion unit 540, and a sinusoidal PWM conversion unit 550.

Multiphase to dq conversion unit 510 may be configured to convert the plurality of currents measured by current detectors 140 in a stationary reference system into a d-axis current value $I_d$ and a q-axis current value $I_q$ in a rotating reference system. In the embodiment illustrated in FIG. 5, multiphase to dq conversion unit 510 may convert the nine currents $i_a, i_b, \ldots$, and $i_i$ into the d-axis current value $I_d$ and the q-axis current value $I_q$. Detailed description of a method for converting the plurality of currents into the d-axis current value $I_d$ and the q-axis current value $I_q$ will be provided with reference to FIG. 6.

Dq equivalent unit 520 may be configured to determine a d-axis voltage command value $V^*_d$ and a q-axis voltage command value $V^*_q$ based on the d-axis current value $I_d$, the q-axis current value $I_q$, a target DC link voltage, a detected DC link voltage provided by DC source 120, and a detected rotation speed of induction motor 110. In the embodiment illustrated in FIG. 5, dq equivalent unit 520 may include a flux versus speed table unit 524, a DC voltage and flux control unit 526, a current control unit 528, a slip frequency calculation unit 530, and an integration unit 532. Flux versus speed table unit 524 may be configured to determine a flux command value based on the detected rotation speed. DC voltage and flux control unit 526 may be configured to determine a d-axis current command value $I^*_d$ and a q-axis current command value $I^*_q$ based on the target DC link voltage, the detected DC link voltage, and the flux command value. Current control unit 528 may be configured to determine a d-axis voltage command value $V^*_d$ and a q-axis voltage command value $V^*_q$ based on a difference between the d-axis current command value $I^*_d$ and the d-axis current value $I_d$, and a difference between the q-axis current command value $I^*_q$ and the q-axis current value $I_q$. Slip frequency calculation unit 530 may be configured to determine a slip frequency based on the d-axis current value $I_d$ and the q-axis current value $I_q$. Integration unit 532 may be configured to integrate a combination of the slip frequency and the detected rotation speed to generate an output angle $\theta'$, which represents a rotation angle between the q-axis and the $\alpha$-axis at the time when dq to multiphase conversion is performed.

Dq to multiphase conversion unit 540 may be configured to convert the d-axis voltage command value $V^*_d$ and the q-axis voltage command value $V^*_q$ into a plurality of command voltages respectively corresponding to the plurality of currents in the stationary coordinate system, based on the output angle $\theta'$. In the embodiment illustrated in FIG. 5, dq to multiphase conversion unit 540 may convert the d-axis voltage command value $V^*_d$ and the q-axis voltage command value $V^*_q$ into nine (9) command voltages $v^*_a$, $v^*_b, \ldots, v^*_i$. Detailed description of a method for converting the d-axis voltage command value $V^*_d$ and the q-axis voltage command value $V^*_q$ into a plurality of command voltages will be provided with reference to FIG. 6.

Sinusoidal PWM conversion unit 550 may be configured to convert the plurality of command voltages to a plurality of control voltages by comparing the plurality of command voltages with a triangular reference waveform having a predetermined frequency. The plurality of command voltages are sine waves. The plurality of control voltages are square waves (i.e., binary waves) having a high voltage level and a low voltage level for turning on or off the plurality of switching elements 132 in inverter 130.

Figure 6:
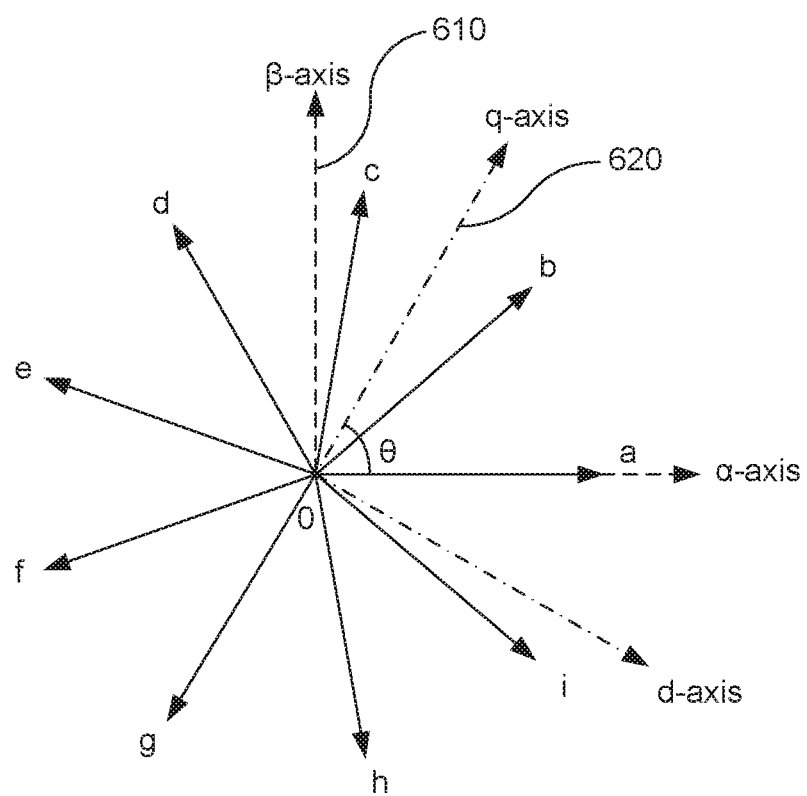
FIG. 6 schematically illustrates a stationary reference system and a rotating reference system, consistent with a disclosed embodiment.

FIG. 6 schematically illustrates a stationary reference system 610 and a rotating reference system 620, consistent with a disclosed embodiment. Stationary reference system 610 may include an $\alpha$-axis and a $\beta$-axis orthogonal to each other. Rotating reference system 620 may include a d-axis and a q-axis orthogonal to each other. Rotating reference system 620 rotates about an origin (labeled as "0" in FIG. 6) of stationary reference system 610 in synchronization with a rotating magnetic field of induction motor 110. In the embodiment illustrated in FIG. 6, there are nine (9) phases labeled as a, b, . . . , and i, a phase angle between two adjacent phases being 40 degrees. The nine phases a, b, . . . , and i may represent the nine currents $i_a, i_b, \ldots$, and $i_i$ that flow between inverter 130 and induction motor 110. The nine phases a, b, . . . , and i may also represent the nine command voltages $v^*_a, v^*_b, \ldots, v^*_i$ or the nine control voltages. Because rotating reference system 620 rotates in synchronization with the rotating magnetic field of induction motor 110, the combined vector of nine phases a, b, . . . , and i are relatively stationary in rotating reference system 620. As a result, the d-axis current value $I_d$, the q-axis current value $I_q$, the d-axis voltage command value $V^*_d$, and the q-axis voltage command value $V^*_q$ are data values instead of space vectors.

Below is an explanation regarding the method implemented by multiphase to dq conversion unit 510 for converting nine first harmonic currents $i_a, i_b, \ldots$, and $i_i$ into the d-axis current value $I_d$ and the q-axis current value $I_q$, consistent with a disclosed embodiment. As explained previously, multiphase to dq conversion unit 510 is included in generator mode controller 500. When an inductor motor operates as a generator, such as inductor motor 300 illustrated in FIG. 3, the plurality of currents $i_a, i_b, \ldots$, and $i_i$ received by induction motor 300 have a first harmonic frequency of the current drive wave form, which results in generation of two (2) poles. The phase difference between neighboring currents $i_a, i_b, \ldots$, and $i_i$ is 40 degrees.

First, multiphase to dq conversion unit 510 may project the nine first harmonic currents $i_a, i_b, \ldots, i_i$ onto the $\alpha$-axis and the $\beta$-axis in stationary reference system 610 to generate an $\alpha$-axis current $i_\alpha$ and a $\beta$-axis current $i_\beta$ represented by Equation (1).

$$\begin{bmatrix} i_\alpha \\ i_\beta \\ 0 \end{bmatrix} = \frac{2}{9} \begin{bmatrix} \cos 0° & \cos 40° & \cos 80° & \cos 120° & \cos 160° & \cos 200° & \cos 240° & \cos 280° & \cos 320° \\ \sin 0° & \sin 40° & \sin 80° & \sin 120° & \sin 160° & \sin 200° & \sin 240° & \sin 280° & \sin 320° \\ 1 & 1 & 1 & 1 & 1 & 1 & 1 & 1 & 1 \end{bmatrix} \cdot \begin{bmatrix} i_a \\ i_b \\ i_c \\ i_d \\ i_e \\ i_f \\ i_g \\ i_h \\ i_i \end{bmatrix} \quad (1)$$

Then, multiphase to dq conversion unit 510 may project the α-axis current $i_\alpha$ and the β-axis current $i_\beta$ onto the d-axis and the q-axis of rotating reference system 620 to generate the d-axis current value $I_d$ and the q-axis current value $I_q$ represented by Equation (2).

voltages $v^*_{\beta 1}$, $v^*_{\beta 2}$, and $v^*_{\beta 3}$, respectively. The relationship between α-axis command voltages $v^*_{\alpha 1}$, $v^*_{\alpha 2}$, and $v^*_{\alpha 3}$, β-axis command voltages $v^*_{\beta 1}$, $v^*_{\beta 2}$, and $v^*_{\beta 3}$, and the nine command voltages $v^*_a$, $v^*_b$, ... $v^*_i$, may be represented by Equation (3).

$$\begin{bmatrix} v^*_{\alpha 1'} \\ v^*_{\beta 1} \\ 0_1 \\ v^*_{\alpha 2} \\ v^*_{\beta 2} \\ 0_2 \\ v^*_{\alpha 3'} \\ v^*_{\beta 3} \\ 0_3 \end{bmatrix} = \frac{2}{9} \begin{bmatrix} \cos 0° & 0 & 0 & \cos 120° & 0 & 0 & \cos 240° & 0 & 0 \\ \sin 0° & 0 & 0 & \sin 120° & 0 & 0 & \sin 240° & 0 & 0 \\ 1 & 0 & 0 & 1 & 0 & 0 & 1 & 0 & 0 \\ 0 & \cos 40° & 0 & 0 & \cos 160° & 0 & 0 & \cos 280° & 0 \\ 0 & \sin 40° & 0 & 0 & \sin 160° & 0 & 0 & \sin 280° & 0 \\ 0 & 1 & 0 & 0 & 1 & 0 & 0 & 1 & 0 \\ 0 & 0 & \cos 80° & 0 & 0 & \cos 200° & 0 & 0 & \cos 320° \\ 0 & 0 & \sin 80° & 0 & 0 & \sin 200° & 0 & 0 & \cos 320° \\ 0 & 0 & 1 & 0 & 0 & 1 & 0 & 0 & 1 \end{bmatrix} \cdot \begin{bmatrix} v^*_a \\ v^*_b \\ v^*_c \\ v^*_d \\ v^*_e \\ v^*_f \\ v^*_g \\ v^*_h \\ v^*_i \end{bmatrix} \quad (3)$$

$$\begin{bmatrix} I_d \\ I_q \end{bmatrix} = \begin{bmatrix} \sin\theta & -\cos\theta \\ \cos\theta & \sin\theta \end{bmatrix} \cdot \begin{bmatrix} i_\alpha \\ i_\beta \end{bmatrix} \quad (2)$$

where $\theta = \theta_0 + \omega t$, $\theta_0$ represents an angle between the q-axis and the α-axis at time 0, and ω represents a rotation speed of induction motor 110. Thus, by using Equations (1) and (2), multiphase to dq conversion unit 510 may convert the nine first harmonic currents $i_a$, $i_b$, ..., and $i_i$ into the d-axis current value $I_d$ and the q-axis current value $I_q$.

Below is an explanation regarding the method implemented by dq to multiphase conversion unit 540 for converting the d-axis voltage command value $V^*_d$ and the q-axis voltage command value $V^*_q$ into nine first harmonic command voltages $v^*_a$, $v^*_b$, ..., $v^*_i$, consistent with a disclosed embodiment. Similar to the nine first harmonic currents $i_a$, $i_b$, ..., and $i_i$ received by induction motor 300, the nine command voltages $v^*_a$, $v^*_b$, ..., $v^*_i$ have the first harmonic frequency.

In order to convert the converting the d-axis voltage command value $V^*_d$ and the q-axis voltage command value $V^*_q$ into the nine first harmonic command voltages $v^*_a$, $v^*_b$, ..., $v^*_i$, the nine first harmonic command voltages $v^*_a$, $v^*_b$, ..., $v^*_i$ may be separated into three groups, i.e., a first group including $v^*_a$, $v^*_d$, and $v^*_g$, a second group including $v^*_b$, $v^*_e$, and $v^*_h$, and a third group including $v^*_c$, $v^*_f$, and $v^*_i$. The first through third groups of command voltages may be projected onto the α-axis and the β-axis in stationary reference system 610 to generate α-axis command voltages $v^*_{\alpha 1}$, $v^*_{\alpha 2}$, and $v^*_{\alpha 3}$, respectively, and β-axis command Assuming that each of the nine first harmonic command voltages $v^*_a$, $v^*_b$, ..., $v^*_i$ may be represented by Equations (4):

$v^*_a = M \cdot \cos(\omega t)$ $v^*_b = M \cdot \cos(\omega t - 40°)$ $v^*_c = M \cdot \cos(\omega t - 80°)$ $v^*_d = M \cdot \cos(\omega t - 120°)$ $v^*_e = M \cdot \cos(\omega t - 160°)$ $v^*_f = M \cdot \cos(\omega t - 200°)$ $v^*_g = M \cdot \cos(\omega t - 240°)$ $v^*_h = M \cdot \cos(\omega t - 280°)$ $v^*_i = M \cdot \cos(\omega t - 320°)$ \quad (4)

Combining Equations (3) and (4), Equations (5) may be obtained.

$$v^*_{\alpha 1} = v^*_{\alpha 2} = v^*_{\alpha 3} = \frac{1}{3} v^*_\alpha = \frac{1}{3} M \cos(\omega t)$$

$$v^*_{\beta 1} = v^*_{\beta 2} = v^*_{\beta 3} = \frac{1}{3} v^*_\beta = \frac{1}{3} M \sin(\omega t) \quad (5)$$

where $v^*_\alpha$ is a combined α-axis command voltage, and $v^*_\beta$ is a combined β-axis command voltage.

A relationship between the d-axis voltage command value $V^*_d$ and the q-axis voltage command value $V^*_q$, and the combined α-axis command voltage v*$_α$ and the combined β-axis command voltage v*$_β$ may be represented b Equation (6).

$$\begin{bmatrix} V_d^* \\ V_q^* \end{bmatrix} = \begin{bmatrix} \sin\theta' & -\cos\theta' \\ \cos\theta' & \sin\theta' \end{bmatrix} \cdot \begin{bmatrix} v_\alpha^* \\ v_\beta^* \end{bmatrix} \quad (6)$$

where θ' is an output angle output by integration unit 532, and represents a rotation angle between the q-axis and the α-axis at the time when dq to multiphase conversion is performed.

The d-axis voltage command value V*$_d$ may be separated into three equal values V*$_{d1}$, V*$_{d2}$, and V*$_{d3}$, and the q-axis voltage command value V*$_q$ may also be separated into three equal values V*$_{q1}$, V*$_{q2}$, and V*$_{q3}$, represented by Equations (7).

$$V_{d1}^* = V_{d2}^* = V_{d3}^* = \frac{1}{3}V_d^* \quad (7)$$

$$V_{q1}^* = V_{q2}^* = V_{q3}^* = \frac{1}{3}V_q^*$$

Combining Equations (5), (6), and (7), Equation (8) may be obtained.

$$\begin{bmatrix} V_{d1}^* \\ V_{q1}^* \\ 0_1 \\ V_{d2}^* \\ V_{q2}^* \\ 0_2 \\ V_{d3}^* \\ V_{q3}^* \\ 0_3 \end{bmatrix} = \begin{bmatrix} \sin\theta' & -\cos\theta' & 0 & 0 & 0 & 0 & 0 & 0 & 0 \\ \cos\theta' & \sin\theta' & 0 & 0 & 0 & 0 & 0 & 0 & 0 \\ 0 & 0 & 1 & 0 & 0 & 0 & 0 & 0 & 0 \\ 0 & 0 & 0 & \sin\theta' & -\cos\theta' & 0 & 0 & 0 & 0 \\ 0 & 0 & 0 & \cos\theta' & \sin\theta' & 0 & 0 & 0 & 0 \\ 0 & 0 & 0 & 0 & 0 & 1 & 0 & 0 & 0 \\ 0 & 0 & 0 & 0 & 0 & 0 & \sin\theta' & -\cos\theta' & 0 \\ 0 & 0 & 0 & 0 & 0 & 0 & \cos\theta' & \sin\theta' & 0 \\ 0 & 0 & 0 & 0 & 0 & 0 & 0 & 0 & 1 \end{bmatrix} \cdot \begin{bmatrix} v_{\alpha 1}^* \\ v_{\beta 1}^* \\ 0_1 \\ v_{\alpha 2}^* \\ v_{\beta 2}^* \\ 0_2 \\ v_{\alpha 3}^* \\ v_{\beta 3}^* \\ 0_3 \end{bmatrix} \quad (8)$$

From Equations (3) and (8), Equations (9), (10), and (11) may be obtained.

$$\begin{bmatrix} v_a^* \\ v_d^* \\ v_g^* \end{bmatrix} = \frac{3}{2}\begin{bmatrix} 1 & \cos 120° & \cos 240° \\ 0 & \sin 120° & \sin 240° \\ 1 & 1 & 1 \end{bmatrix}^{-1}\begin{bmatrix} V_d^*\sin\theta' + V_q^*\cos\theta' \\ V_q^*\sin\theta' - V_d^*\cos\theta' \\ 0 \end{bmatrix} \quad (9)$$

$$\begin{bmatrix} v_b^* \\ v_e^* \\ v_h^* \end{bmatrix} = \frac{3}{2}\begin{bmatrix} \cos 40° & \cos 160° & \cos 280° \\ \cos 40° & \sin 160° & \sin 280° \\ 1 & 1 & 1 \end{bmatrix}^{-1}\begin{bmatrix} V_d^*\sin\theta' + V_q^*\cos\theta' \\ V_q^*\sin\theta' - V_d^*\cos\theta' \\ 0 \end{bmatrix} \quad (10)$$

$$\begin{bmatrix} v_c^* \\ v_f^* \\ v_i^* \end{bmatrix} = \frac{3}{2}\begin{bmatrix} \cos 80° & \cos 200° & \cos 320° \\ \sin 80° & \sin 200° & \sin 320° \\ 1 & 1 & 1 \end{bmatrix}^{-1}\begin{bmatrix} V_d^*\sin\theta' + V_q^*\cos\theta' \\ V_q^*\sin\theta' - V_d^*\cos\theta' \\ 0 \end{bmatrix} \quad (11)$$

Thus, by using Equations (9), (10), and (11), dq to multiphase conversion unit 540 may convert the d-axis voltage command value V*$_d$ and the q-axis voltage command value V*$_q$ into the nine first harmonic command voltages v*$_a$, v*$_b$, ..., v*$_i$.

Multiphase to dq conversion unit 410 may implement a similar method for converting nine third harmonic currents $i_a$, $i_b$, ..., and $i_i$ into the d-axis current value $I_d$ and the q-axis current value $I_q$. As explained previously, multiphase to dq conversion unit 410 is included in starter mode controller 400. When an inductor motor operates as a starter, such as inductor motor 200 illustrated in FIG. 2, the plurality of currents $i_a$, $i_b$, ..., and $i_i$ received by induction motor 200 have a third harmonic frequency of the current drive wave form, which results in generation of six (6) poles. The phase difference between neighboring currents $i_a$, $i_b$, ..., and $i_i$ is 120 degrees. Accordingly, $i_a=i_d=i_g$, $i_b=i_e=i_h$, and $i_c=i_f=i_i$.

First, multiphase to dq conversion unit 410 may project the nine third harmonic currents $i_a$, $i_b$, ..., $i_i$, onto the α-axis and the β-axis in stationary reference system 610 to generate an α-axis current $i_α$ and β-axis current $i_β$ represented by Equation (12).

$$\begin{bmatrix} i_\alpha \\ i_\beta \\ 0 \end{bmatrix} = \frac{2}{9}\begin{bmatrix} \cos 0° & \cos 120° & \cos 240° & \cos 0° & \cos 120° & \cos 240° & \cos 0° & \cos 120° & \cos 240° \\ \sin 0° & \sin 120° & \sin 240° & \sin 0° & \sin 120° & \sin 240° & \sin 0° & \sin 120° & \sin 240° \\ 1 & 1 & 1 & 1 & 1 & 1 & 1 & 1 & 1 \end{bmatrix} \cdot \begin{bmatrix} i_a \\ i_b \\ i_c \\ i_d \\ i_e \\ i_f \\ i_g \\ i_h \\ i_i \end{bmatrix} \quad (12)$$

Then, multiphase to dq conversion unit 410 may project the α-axis current $i_\alpha$ and the β-axis current $i_\beta$ onto the d-axis and the q-axis of rotating reference system 620 to generate the d-axis current value $I_d$ and the q-axis current value $I_q$ represented by Equation (2).

Similarly, dq to multiphase conversion unit 440 may implement a similar method for converting the d-axis voltage command value $V^*_d$ and the q-axis voltage command value $V^*_q$ into nine third harmonic command voltages $v^*_a$, $v^*_b$, ..., $v^*_i$. Similarly, the nine third harmonic command voltages $v^*_a$, $v^*_b$, ..., $v^*_i$ have the third harmonic frequency. Accordingly, $v^*_a = v^*_d = v^*_g$, $v^*_b = v^*_e = v^*_h$, and $v^*_c = v^*_f = v^*_i$.

Thus, dq to multiphase conversion unit 440 may convert the d-axis voltage command value $V^*_d$ and the q-axis voltage command value $V^*_q$ into the nine third harmonic command voltages $v^*_a, v^*_b, \ldots, v^*_i$ by using Equation (13).

$$\begin{bmatrix} v^*_a \\ v^*_b \\ v^*_c \end{bmatrix} = \begin{bmatrix} v^*_d \\ v^*_e \\ v^*_f \end{bmatrix} = \begin{bmatrix} v^*_g \\ v^*_h \\ v^*_i \end{bmatrix} = \frac{3}{2} \begin{bmatrix} 1 & \cos 120° & \cos 240° \\ 0 & \sin 120° & \sin 240° \\ 1 & 1 & 1 \end{bmatrix}^{-1} \begin{bmatrix} V^*_d \sin\theta' + V^*_q \cos\theta' \\ V^*_q \sin\theta' - V^*_d \cos\theta' \\ 0 \end{bmatrix} \quad (13)$$

The above-described methods are implemented for 9 phases to dq conversion and for dq to 9 phases conversion. Those skilled in the art may appreciate that similar methods may be used for n phases to dq conversion and for dq to n phases conversion, with n being an integer that is multiple of 3.

According to a disclosed embodiment, for converting n currents $i_{p1}, i_{p2}, \ldots$, and $i_{pn}$ into a d-axis current value $I_d$ and a q-axis current value $I_q$, a multiphase to dq conversion unit may first project the n currents $i_{p1}, i_{p2}, \ldots$, and $i_{pn}$ onto the α-axis and the β-axis in stationary reference system 610 to generate an α-axis current $i_\alpha$ and a β-axis current $i_\beta$ represented by Equation (14).

For converting the d-axis voltage command value $V^*_d$ and the q-axis voltage command value $V^*_q$ into n first harmonic command voltages $v^*_{p1}, v^*_{p2}, \ldots, v^*_{pn}$, the n first harmonic command voltages $v^*_{p1}, v^*_{p2}, \ldots, v^*_{pn}$ are separated into l groups, with $$l = \frac{n}{3}.$$

A j-th group of command voltages includes three command voltages $$v^*_{p(0 \cdot \frac{n}{3} + j)}, v^*_{p(1 \cdot \frac{n}{3} + j)},$$

and $$v^*_{p(2 \cdot \frac{n}{3} + j)},$$

with j=1, 2, ... l. The l groups of command voltages may be projected onto the α-axis and the β-axis in stationary reference system 610 to generate α-axis command voltages $v^*_{\alpha 1}, v^*_{\alpha 2}, \ldots$, and $v^*_{\alpha l}$, respectively, and β-axis command voltages $v^*_{\beta 1}, v^*_{\beta 2}, \ldots$, and $v^*_{\beta l}$, respectively. In addition, the d-axis voltage command value $V^*_d$ may be separated into l equal values $V^*_{d1}, V^*_{d2}, \ldots$, and $V^*_{dl}$, and the q-axis voltage command value $V^*_q$ may also be separated into l equal values $V^*_{q1}, V^*_{q2}, \ldots$, and $V^*_{ql}$. The relationship between the d-axis voltage command values $V^*_{d1}, V^*_{d2}, \ldots$, and $V^*_{dl}$, the q-axis voltage command values $V^*_{q1}, V^*_{q2}, \ldots$, and $V^*_{ql}$, the α-axis command voltages $v^*_{\alpha 1}, v^*_{\alpha 2}, \ldots$, and $v^*_{\alpha l}$, the β-axis command voltages $v^*_{\beta 1}, v^*_{\beta 2}, \ldots$, and $v^*_{\beta l}$, and the n first harmonic command voltages $v^*_{p1}, v^*_{p2}, \ldots, v^*_{pn}$, are represented by Equation (16).

$$\begin{bmatrix} i_\alpha \\ i_\beta \\ 0 \end{bmatrix} = \frac{2}{n} \begin{bmatrix} \cos\left(0 \cdot \frac{P}{2} \cdot \frac{2\pi}{n}\right) & \cos\left(1 \cdot \frac{P}{2} \cdot \frac{2\pi}{n}\right) & \cos\left(2 \cdot \frac{P}{2} \cdot \frac{2\pi}{n}\right) & \ldots & \cos\left((n-1) \cdot \frac{P}{2} \cdot \frac{2\pi}{n}\right) \\ \sin\left(0 \cdot \frac{P}{2} \cdot \frac{2\pi}{n}\right) & \sin\left(1 \cdot \frac{P}{2} \cdot \frac{2\pi}{n}\right) & \sin\left(2 \cdot \frac{P}{2} \cdot \frac{2\pi}{n}\right) & \ldots & \sin\left((n-1) \cdot \frac{P}{2} \cdot \frac{2\pi}{n}\right) \\ 1 & 1 & 1 & \ldots & 1 \end{bmatrix} \cdot \begin{bmatrix} i_{p1} \\ i_{p2} \\ i_{p3} \\ \vdots \\ i_{pn} \end{bmatrix} \quad (14)$$

where P is the number of poles generated in the induction motor. The n currents $i_{p1}, i_{p2}, \ldots$, and $i_{pn}$ may be either first harmonic currents or third harmonic currents, or even other order harmonic current.

Then, the multiphase to dq conversion unit may project the α-axis current $i_\alpha$ and the β-axis current $i_\beta$ onto the d-axis and the q-axis of rotating reference system 620 to generate the d-axis current value $I_d$ and the q-axis current value $I_q$ represented by Equation (15).

$$\begin{bmatrix} I_d \\ I_q \end{bmatrix} = \begin{bmatrix} \sin\theta & -\cos\theta \\ \cos\theta & \sin\theta \end{bmatrix} \cdot \begin{bmatrix} i_\alpha \\ i_\beta \end{bmatrix} \quad (15)$$

$$\begin{bmatrix} V^*_{q1} \\ V^*_{d1} \\ 0_1 \\ V^*_{q2} \\ V^*_{d2} \\ 0_2 \\ \vdots \\ V^*_{ql} \\ V^*_{dl} \\ 0_l \end{bmatrix} = C1 \cdot \begin{bmatrix} v^*_{\alpha 1} \\ v^*_{\beta 1} \\ 0_1 \\ v^*_{\alpha 2} \\ v^*_{\beta 2} \\ 0_2 \\ \vdots \\ v^*_{\alpha l} \\ v^*_{\beta l} \\ 0_l \end{bmatrix} = C1 \cdot C2 \cdot \begin{bmatrix} v^*_{p1} \\ v^*_{p2} \\ v^*_{p3} \\ v^*_{p4} \\ v^*_{p5} \\ v^*_{p6} \\ \vdots \\ v^*_{pn} \end{bmatrix} \quad (16)$$

where both of C1 and C2 are n×n matrices, $$C1 = A \cdot \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix}, A = \begin{bmatrix} \cos\theta' & \sin\theta' & 0 \\ \sin\theta' & -\cos\theta' & 0 \\ 1 & 1 & 1 \end{bmatrix}, \text{ and}$$

$$C2 = \frac{2}{n} \begin{bmatrix} M_{11} & M_{12} & M_{13} \\ M_{21} & M_{22} & M_{23} \\ M_{l1} & M_{l2} & M_{l3} \end{bmatrix}.$$

In matrix A, θ' is an output angle output by integration unit 532, and represents a rotation angle between the q-axis and the α-axis at the time when dq to multiphase conversion is performed. Each one of $M_{11}, M_{12}, \ldots, M_{l3}$ is a 3×l matrix, and $$M_{ji} = \begin{bmatrix} 0 & \cdots & \cos\left[\left((j-1) + \frac{n}{3}(i-1)\right) \cdot \frac{P}{2} \cdot \frac{2\pi}{n}\right] & \cdots & 0 \\ 0 & \cdots & \sin\left[\left((j-1) + \frac{n}{3}(i-1)\right) \cdot \frac{P}{2} \cdot \frac{2\pi}{n}\right] & \cdots & 0 \\ 0 & \cdots & 1 & \cdots & 0 \end{bmatrix}$$

where i=1,2,3, and j=1,2,..., l, and P is the number of poles generated by the induction motor.

From Equation (16), Equation (17) may be obtained for calculating the j-th group of first harmonic command voltages $$v^*_{p(0 \cdot \frac{n}{3}+j)}, v^*_{p(1 \cdot \frac{n}{3}+j)}, \text{ and } v^*_{p(2 \cdot \frac{n}{3}+j)}.$$

$$\begin{bmatrix} v^*_{p(0 \cdot \frac{n}{3}+j)} \\ v^*_{p(1 \cdot \frac{n}{3}+j)} \\ v^*_{p(2 \cdot \frac{n}{3}+j)} \end{bmatrix} = \frac{3}{2} \begin{bmatrix} \cos\left(\left(0 \cdot \frac{n}{3}+j-1\right) \cdot \frac{2\pi}{n}\right) & \cos\left(\left(1 \cdot \frac{n}{3}+j-1\right) \cdot \frac{2\pi}{n}\right) & \cos\left(\left(2 \cdot \frac{n}{3}+j-1\right) \cdot \frac{2\pi}{n}\right) \\ \sin\left(\left(0 \cdot \frac{n}{3}+j-1\right) \cdot \frac{2\pi}{n}\right) & \sin\left(\left(1 \cdot \frac{n}{3}+j-1\right) \cdot \frac{2\pi}{n}\right) & \sin\left(\left(2 \cdot \frac{n}{3}+j-1\right) \cdot \frac{2\pi}{n}\right) \\ 1 & 1 & 1 \end{bmatrix}^{-1} \cdot \begin{bmatrix} V^*_d \sin\theta' + V^*_q \cos\theta' \\ V^*_q \sin\theta' - V^*_d \cos\theta' \\ 0 \end{bmatrix} \quad (17)$$

Thus, by using Equation (17), a dq to multiphase conversion unit may convert the d-axis voltage command value $V^*_d$ and the q-axis voltage command value $V^*_q$ into the n first harmonic command voltages $v^*_{p1}, v^*_{p2}, \ldots, v^*_{pn}$.

For converting the d-axis voltage command value $V^*_d$ and the q-axis voltage command value $V^*_q$ into n other order harmonic (i.e., other than first harmonic) command voltages $v^*_{p1}, v^*_{p2}, \ldots, v^*_{pn}$, the dq to multiphase conversion unit may use Equation (18) as follows.

$$\begin{bmatrix} v^*_{p(1+3k)} \\ v^*_{p(2+3k)} \\ v^*_{p3(3+3k)} \end{bmatrix} = \frac{3}{2} \begin{bmatrix} 1 & \cos 120° & \cos 240° \\ 0 & \sin 120° & \sin 240° \\ 1 & 1 & 1 \end{bmatrix}^{-1} \begin{bmatrix} V^*_d \sin\theta' + V^*_q \cos\theta' \\ V^*_q \sin\theta' - V^*_d \cos\theta' \\ 0 \end{bmatrix} \quad (18)$$

where $$k = 0, 1, \ldots, \frac{n}{3} - 1.$$

Figure 7:
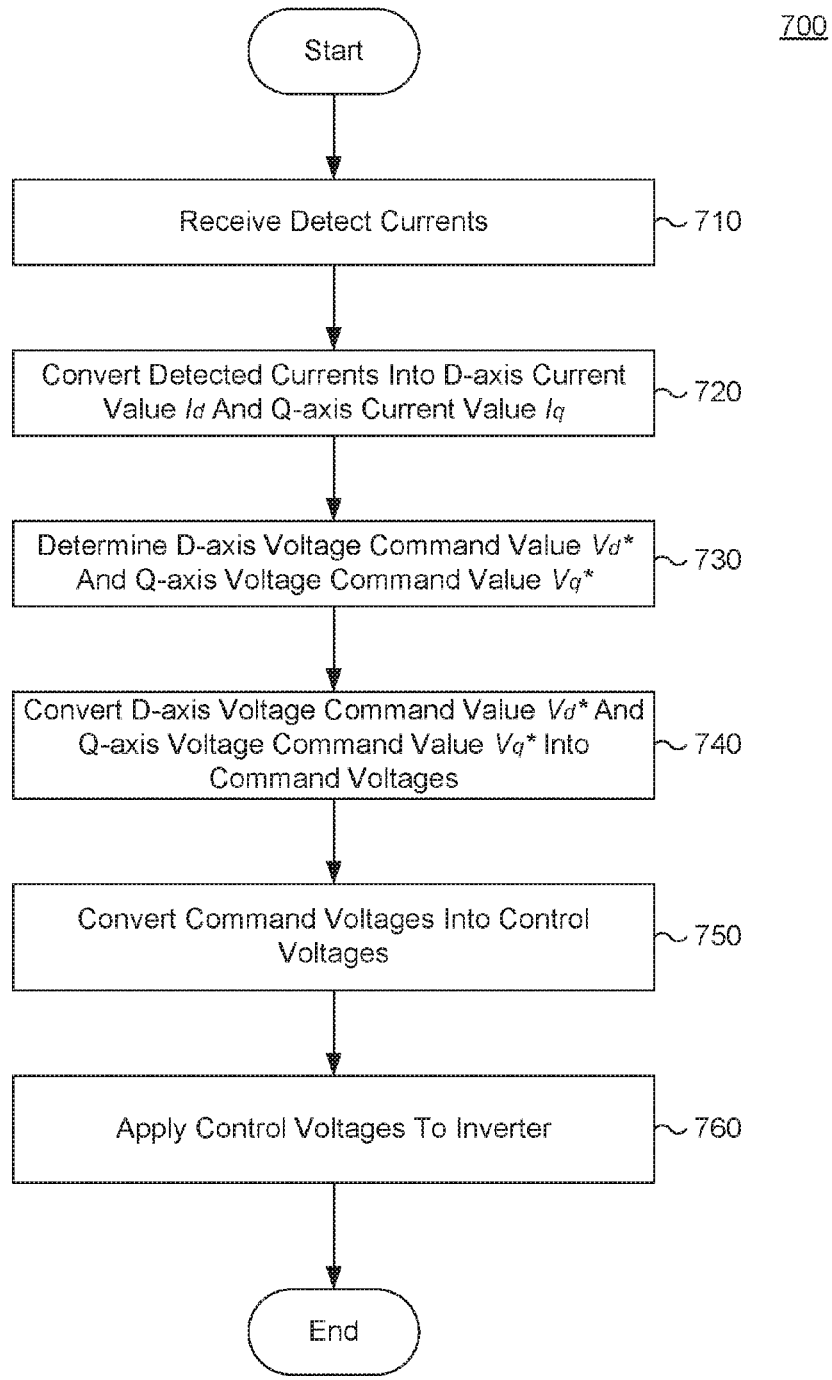
FIG. 7 illustrates a flow chart of an exemplary process for controlling an induction motor, consistent with a disclosed embodiment.

FIG. 7 illustrates a flow chart of an exemplary process 700 for controlling induction motor 110, consistent with a disclosed embodiment. Process 700 may be implemented by controller 150.

As illustrated in FIG. 7, controller 150 may first receive a signal representing a plurality of currents that flow between inverter 130 and induction motor 110 (step 710). The number of currents equals to the number of phases that induction motor 110 has. For example, in the embodiment illustrated in FIG. 1 where induction motor 110 is a nine-phase induction motor, controller 150 may receive signals from the nine current detectors 140a, 140b, ..., and 140i, respectively, and the signals represent the nine currents $i_a$, $i_b$, ..., and $i_i$, respectively.

Controller 150 may convert the plurality of detected currents into a d-axis current value $I_d$ and a q-axis current value $I_q$ (step 720). For example, when induction motor 110 is a nine-phase induction motor and controller 150 operates as a generator mode controller, controller 150 may convert the nine first harmonic currents $i_a, i_b, \ldots,$ and $i_i$ into a d-axis current value $I_d$ and a q-axis current value $I_q$ according to Equations (1) and (2). As another example, when induction motor 110 is a nine-phase induction motor and controller 150 operates as a starter mode controller, controller 150 may convert the nine first harmonic currents $i_a, i_b, \ldots,$ and $i_i$ into a d-axis current value $I_d$ and a q-axis current value $I_q$ according to Equations (12) and (2). As still another example, when induction motor 110 is an n-phase induction motor with n being an integer that is a multiple of 3, controller 150 may convert n currents $i_{p1}, i_{p2}, \ldots,$ and $i_{pn}$ into a d-axis current value $I_d$ and a q-axis current value $I_q$ according to Equations (14) and (15).

Controller 150 may determine a d-axis voltage command value $V^*_d$ and a q-axis voltage command value $V^*_q$ based on the d-axis current value $I_d$, the q-axis current value $I_q$ (step 730). For example, when controller 150 operates as a starter mode controller, controller 150 may determine the d-axis voltage command value $V^*_d$ and the q-axis voltage command value $V^*_q$ based on the d-axis current value $I_d$, the q-axis current value $I_q$, a target rotation speed of induction motor 110, and a detected rotation speed of induction motor 110, according to the method described with respect to FIG. 4. When controller 150 operates as a generator mode controller, controller 150 may determine the d-axis voltage command value $V^*_d$ and the q-axis voltage command value $V^*_q$ based on the d-axis current value $I_d$, the q-axis current value $I_q$, a target DC link voltage, a detected DC link voltage provided by DC source 120, and a detected rotation speed of induction motor 110, according to the method described with respect to FIG. 5.

Controller 150 may convert the determined d-axis voltage command value V*$_d$ and q-axis voltage command value V*$_q$ into a plurality of command voltages (step 740). The number of command voltages equals to the number of phases that induction motor 110 has. For example, when induction motor 110 is the nine-phase induction motor and controller 150 operates as a generator mode controller, controller 150 may convert the d-axis voltage command value V*$_d$ and q-axis voltage command value V*$_q$ into nine first harmonic command voltages v*$_a$, v*$_b$, ..., v*$_i$ according to Equations (9), (10), and (11). As another example, when induction motor 110 is the nine-phase induction motor and controller 150 operates as a starter mode controller, controller 150 may convert the d-axis voltage command value V*$_d$ and q-axis voltage command value V*$_q$ into nine third harmonic command voltages v*$_a$, v*$_b$, ..., v*$_i$ according to Equation (13). As still another example, when induction motor 110 is the n-phase induction motor with n being an integer that is a multiple of 3 and controller 150 operates as a generator mode controller, controller 150 may convert the d-axis voltage command value V*$_d$ and q-axis voltage command value V*$_q$ into n first order command voltages v*$_{p1}$, v*$_{p2}$, ..., v*$_{pn}$ according to Equation (17). As a further example, when induction motor 110 is the n-phase induction motor and controller 150 operates as a starter mode controller, controller 150 may convert the d-axis voltage command value V*$_d$ and q-axis voltage command value V*$_q$ into n third order command voltages v*$_{p1}$, v*$_{p2}$, ..., v*$_{pn}$ according to Equation (18).

Controller 150 may convert the plurality of command voltages into a plurality of control voltages (step 750). For example, controller 150 may compare the plurality of command voltages, that are sign waves, with a triangular reference waveform having a predetermined frequency, to generate the plurality of control voltages, that are square waves.

Finally, controller 150 may apply the plurality of control voltages to inverter 130 (step 760). For example, in the embodiment illustrated in FIG. 1, controller 150 may apply the plurality of control voltages v$_a$, v$_b$, ..., and v$_i$ to control terminals 136 of switching elements 132. After step 760, controller 150 may finish process 700.

INDUSTRIAL APPLICABILITY

The disclosed multiphase induction motor may be used as both a starter and an alternator or generator of electrical power. Induction motors with fewer or more phases than the nine phase induction motor may also be used in accordance with the principles set forth in this disclosure. When used as a starter, the multiphase induction motor receives power of an inverter and produces sufficient torque for starting the engine of the machine on which it is mounted. When used as a generator, the multiphase induction motor supplies power to a battery via the inverter.

The inverter may be controlled by the disclosed controller which applies a plurality of control voltages to the inverter. The controller may selectively operate in a starter mode or a generator mode. When the controller operates in the starter mode, the controller applies the plurality of control voltages according to a target rotation speed. When the controller operates in the generator mode, the controller applies the plurality of control voltages according to a target DC link voltage.

The disclosed controller may determine the plurality of control voltages based on a plurality of currents that flow between the inverter and the multiphase induction motor according to the above-described methods. Compared with conventional methods for determining the plurality of control voltages, the above-described method reduces the computational complexity and computational time, and is relatively easy for adaption, while the determination result is equally accurate.

It will be apparent to those skilled in the art that various modifications and variations can be made to the multiphase motor generator system of the present disclosure. Other embodiments of the induction motor, inverter, and controller, and methods of controlling the inverter will be apparent to those skilled in the art after consideration of the specification and practice of the methods disclosed herein. It is intended that the specification and examples be considered as exemplary only, with a true scope of the disclosure being indicated by the following claims and their equivalents.

What is claimed is:

1. A multiphase motor generator system, comprising:
   a multiphase induction motor having a plurality of separate terminals;
   a multiphase inverter coupled to a DC link voltage source and the plurality of terminals of the multiphase induction motor;
   a plurality of current detectors configured to detect a plurality of currents that flow between the multiphase inverter and the plurality of terminals of the multiphase induction motor; and
   a controller coupled to the current detectors and the multiphase inverter, and configured to receive the detected currents and output a plurality of control voltages to the multiphase inverter, the controller including:
      a multiphase to direct-quadrature (dq) conversion unit configured to convert the plurality of currents into a direct-axis (d-axis) current value I$_d$ and a quadrature-axis (q-axis) current value I$_q$ in a rotating reference system;
      a dq equivalent unit configured to determine a d-axis voltage command value V*$_d$ and a q-axis voltage command value V*$_q$ based on the d-axis current value I$_d$ and the q-axis current value I$_q$;
      a dq to multiphase conversion unit configured to convert the d-axis voltage command value V*$_d$ and the q-axis voltage command value V*$_q$ into a plurality of command voltages; and
      a pulse-width-modulator (PWM) converter configured to convert the plurality of command voltages to the plurality of control voltages, and apply the plurality of control voltages to the multiphase inverter;
   wherein the multiphase induction motor is an n-phase induction motor, with n being an integer that is multiple of 3,
   the multiphase to dq conversion unit being configured to:
      project n currents i$_{p1}$, i$_{p2}$, ..., and i$_{pn}$ onto an α-axis and a β-axis in a stationary reference system to generate an α-axis current i$_α$ and a β-axis current i$_β$ represented by the following equation, $$\begin{bmatrix} i_\alpha \\ i_\beta \\ 0 \end{bmatrix} = \frac{2}{n} \begin{bmatrix} \cos\left(0 \cdot \frac{P}{2} \cdot \frac{2\pi}{n}\right) & \cos\left(1 \cdot \frac{P}{2} \cdot \frac{2\pi}{n}\right) & \cos\left(2 \cdot \frac{P}{2} \cdot \frac{2\pi}{n}\right) & \cdots \\ \sin\left(0 \cdot \frac{P}{2} \cdot \frac{2\pi}{n}\right) & \sin\left(1 \cdot \frac{P}{2} \cdot \frac{2\pi}{n}\right) & \sin\left(2 \cdot \frac{P}{2} \cdot \frac{2\pi}{n}\right) & \cdots \\ 1 & 1 & 1 & \cdots \end{bmatrix}$$

-continued $$\left.\cos\left((n-1)\cdot\frac{P}{2}\cdot\frac{2\pi}{n}\right)\right] \begin{bmatrix} i_{p1} \\ i_{p2} \\ i_{p3} \\ \vdots \\ i_{pn} \end{bmatrix}$$
$$\sin\left((n-1)\cdot\frac{P}{2}\cdot\frac{2\pi}{n}\right)\right]$$
$$1$$

where P represents the number of poles generated in the multiphase induction motor; and project the α-axis current $i_\alpha$ and the β-axis current $i_\beta$ onto a d-axis and a q-axis of the rotating reference system to generate the d-axis current value $I_d$ and the q-axis current value $I_q$ represented by the following equation, $$\begin{bmatrix} I_d \\ I_q \end{bmatrix} = \begin{bmatrix} \sin\theta & -\cos\theta \\ \cos\theta & \sin\theta \end{bmatrix} \cdot \begin{bmatrix} i_\alpha \\ i_\beta \end{bmatrix}$$

where $\theta = \theta_0 + \omega t$, $\theta_0$ represents an angle between the q-axis and the α-axis at time 0, and ω represents a rotation speed of the n-phase induction motor.

2. The system of claim 1, wherein the dq to multiphase converter is configured to convert the d-axis voltage command value $V^*_d$ and the q-axis voltage command value $V^*_q$ into n first harmonic command voltages $v^*_{p1}, v^*_{p2}, \ldots, v^*_{pn}$, based on the following equation, $$\begin{bmatrix} v^*_{p(0\cdot\frac{n}{3}+j)} \\ v^*_{p(1\cdot\frac{n}{3}+j)} \\ v^*_{p(2\cdot\frac{n}{3}+j)} \end{bmatrix} =$$

$$\frac{3}{2}\begin{bmatrix} \cos\left(\left(0\cdot\frac{n}{3}+j-1\right)\cdot\frac{2\pi}{n}\right) & \cos\left(\left(1\cdot\frac{n}{3}+j-1\right)\cdot\frac{2\pi}{n}\right) & \cos\left(\left(2\cdot\frac{n}{3}+j-1\right)\cdot\frac{2\pi}{n}\right) \\ \sin\left(\left(0\cdot\frac{n}{3}+j-1\right)\cdot\frac{2\pi}{n}\right) & \sin\left(\left(1\cdot\frac{n}{3}+j-1\right)\cdot\frac{2\pi}{n}\right) & \sin\left(\left(2\cdot\frac{n}{3}+j-1\right)\cdot\frac{2\pi}{n}\right) \\ 1 & 1 & 1 \end{bmatrix}^{-1} \cdot \begin{bmatrix} V^*_d\sin\theta' + V^*_q\cos\theta' \\ V^*_q\sin\theta' - V^*_d\cos\theta' \\ 0 \end{bmatrix}$$

where $$j = 1, 2, \ldots, l, l = \frac{n}{3},$$

and θ' is an output angle that represents a rotation angle between the q-axis and the α-axis at the time when dq to multiphase conversion is performed.

3. The system of claim 2, wherein the dq to multiphase converter is configured to convert the d-axis voltage command value $V^*_d$ and the q-axis voltage command value $V^*_q$ into n other order harmonic command voltages $v^*_{p1}, v^*_{p2}, \ldots, v^*_{pn}$, that are other than first harmonic voltages, based on the following equation, $$\begin{bmatrix} v^*_{p(1+3k)} \\ v^*_{p(2+3k)} \\ v^*_{p3(3+3k)} \end{bmatrix} = \frac{3}{2}\begin{bmatrix} 1 & \cos 120° & \cos 240° \\ 0 & \sin 120° & \sin 240° \\ 1 & 1 & 1 \end{bmatrix}^{-1} \begin{bmatrix} V^*_d\sin\theta' + V^*_q\cos\theta' \\ V^*_q\sin\theta' - V^*_d\cos\theta' \\ 0 \end{bmatrix}$$

where $$k = 0, 1, \ldots, \frac{n}{3} - 1,$$

and θ' is an output angle that represents a rotation angle between the q-axis and the α-axis at the time when dq to multiphase conversion is performed.

4. The system of claim 1, wherein the controller is configured to selectively operate in a starter mode and a generator mode, when the controller operates in the starter mode, the controller controls the multiphase inverter according to a target rotation speed, and when the controller operates in the generator mode, the controller controls the multiphase inverter according to a target DC link voltage.

5. The system of claim 4, wherein the multiphase induction motor is a 9-phase induction motor and the multiphase inverter is a 9-phase inverter, and when the controller operates in the starter mode, the controller is configured to control the 9-phase inverter to supply nine third harmonic currents to the 9-phase induction motor which generates six magnetic poles.

6. The system of claim 4, wherein the multiphase induction motor is a 9-phase induction motor and the multiphase inverter is a 9-phase inverter, and when the controller operates in the generator mode, the controller is configured to control the 9-phase inverter to supply nine first harmonic currents to the 9-phase induction motor which generates two magnetic poles.

7. The system of claim 1, wherein the multiphase inverter includes a plurality of pairs of switching elements, each pair of switching elements being coupled between the DC link voltage and a corresponding one of the plurality of terminals of the multiphase induction motor, and each pair of switches being coupled to receive a corresponding one of the plurality of control voltages from the controller.

8. A controller for controlling a multiphase inverter that supplies power to a multiphase induction motor, the controller comprising:

a processor;

a non-transitory memory configured to store instructions that, when executed, enable the processor to:

obtain data representing a plurality of currents that flow between the multiphase inverter and the multiphase induction motor;

convert the plurality of currents into a direct-axis (d-axis) current value $I_d$ and a quadrature-axis (q-axis) current value $I_q$ in a rotating reference system;

generate a d-axis voltage command value $V^*_d$ and a q-axis voltage command value $V^*_q$ based on the d-axis current value $I_d$ and the q-axis current value $I_q$;

convert the d-axis voltage command value $V^*_d$ and the q-axis voltage command value $V^*_q$ into a plurality of command voltages; and convert the plurality of command voltages to the plurality of control voltages, and apply the plurality of control voltages to the multiphase inverter;

wherein the multiphase induction motor is an n-phase induction motor, with n being an integer that is multiple of 3, and wherein the non-transitory memory is further configured to store instructions that enable the processor to:

project n currents $i_{p1}, i_{p2}, \ldots,$ and $i_{pn}$ onto an α-axis and a β-axis in a stationary reference system to generate an α-axis current $i_\alpha$ and a β-axis current $i_\beta$ represented by the following equation, $$\begin{bmatrix} i_\alpha \\ i_\beta \\ 0 \end{bmatrix} = \frac{2}{n} \begin{bmatrix} \cos\left(0 \cdot \frac{P}{2} \cdot \frac{2\pi}{n}\right) & \cos\left(1 \cdot \frac{P}{2} \cdot \frac{2\pi}{n}\right) & \cos\left(2 \cdot \frac{P}{2} \cdot \frac{2\pi}{n}\right) & \ldots & \cos\left((n-1) \cdot \frac{P}{2} \cdot \frac{2\pi}{n}\right) \\ \sin\left(0 \cdot \frac{P}{2} \cdot \frac{2\pi}{n}\right) & \sin\left(1 \cdot \frac{P}{2} \cdot \frac{2\pi}{n}\right) & \sin\left(2 \cdot \frac{P}{2} \cdot \frac{2\pi}{n}\right) & \ldots & \sin\left((n-1) \cdot \frac{P}{2} \cdot \frac{2\pi}{n}\right) \\ 1 & 1 & 1 & \ldots & 1 \end{bmatrix} \cdot \begin{bmatrix} i_{p1} \\ i_{p2} \\ i_{p3} \\ \vdots \\ i_{pn} \end{bmatrix}$$

where P represents the number of poles generated in the multiphase induction motor; and project the α-axis current $i_\alpha$ and the β-axis current $i_\beta$ onto a d-axis and a q-axis of the rotating reference system to generate the d-axis current value $I_d$ and the q-axis current value $I_q$ represented by the following equation, $$\begin{bmatrix} I_d \\ I_q \end{bmatrix} = \begin{bmatrix} \sin\theta & -\cos\theta \\ \cos\theta & \sin\theta \end{bmatrix} \cdot \begin{bmatrix} i_\alpha \\ i_\beta \end{bmatrix}$$

where $\theta = \theta_0 + \omega t$, $\theta_0$ represents an angle between the q-axis and the α-axis at time 0, and ω represents a rotation speed of the n-phase induction motor.

9. The controller of claim 8, wherein the non-transitory memory is further configured to store instructions that enable the processor to:

convert the d-axis voltage command value $V^*_d$ and the q-axis voltage command value $V^*_q$ into n first harmonic command voltages $v^*_{p1}, v^*_{p2}, \ldots, v^*_{pn}$, based on the following equation, $$\begin{bmatrix} v^*_{p(0 \cdot \frac{n}{3}+j)} \\ v^*_{p(1 \cdot \frac{n}{3}+j)} \\ v^*_{p(2 \cdot \frac{n}{3}+j)} \end{bmatrix} = \frac{3}{2} \begin{bmatrix} \cos\left(\left(0 \cdot \frac{n}{3}+j-1\right) \cdot \frac{2\pi}{n}\right) & \cos\left(\left(1 \cdot \frac{n}{3}+j-1\right) \cdot \frac{2\pi}{n}\right) & \cos\left(\left(2 \cdot \frac{n}{3}+j-1\right) \cdot \frac{2\pi}{n}\right) \\ \sin\left(\left(0 \cdot \frac{n}{3}+j-1\right) \cdot \frac{2\pi}{n}\right) & \sin\left(\left(1 \cdot \frac{n}{3}+j-1\right) \cdot \frac{2\pi}{n}\right) & \sin\left(\left(2 \cdot \frac{n}{3}+j-1\right) \cdot \frac{2\pi}{n}\right) \\ 1 & 1 & 1 \end{bmatrix}^{-1} \cdot \begin{bmatrix} V^*_d \sin\theta' + V^*_q \cos\theta' \\ V^*_q \sin\theta' - V^*_d \cos\theta' \\ 0 \end{bmatrix}$$

where $$j = 1, 2, \ldots, l, l = \frac{n}{3},$$

and θ' is an output angle that represents a rotation angle between the q-axis and the α-axis at the time when dq to multiphase conversion is performed.

10. The controller of claim 9, wherein the non-transitory memory is further configured to store instructions that enable the processor to:

convert the d-axis voltage command value and the q-axis voltage command value $V^*_q$ into n other order harmonic command voltages $v^*_{p1}, v^*_{p2}, \ldots, v^*_{pn}$ that are other than first harmonic voltages, based on the following equation, $$\begin{bmatrix} v^*_{p(1+3k)} \\ v^*_{p(2+3k)} \\ v^*_{p3(3+3k)} \end{bmatrix} = \frac{3}{2} \begin{bmatrix} 1 & \cos 120° & \cos 240° \\ 0 & \sin 120° & \sin 240° \\ 1 & 1 & 1 \end{bmatrix}^{-1} \begin{bmatrix} V^*_d \sin\theta' + V^*_q \cos\theta' \\ V^*_q \sin\theta' - V^*_d \cos\theta' \\ 0 \end{bmatrix}$$

where $$k = 0, 1, \ldots, \frac{n}{3} - 1,$$

and θ' is an output angle that represents a rotation angle between the q-axis and the α-axis at the time when dq to multiphase conversion is performed.

11. The controller of claim 8, wherein the controller is configured to selectively operate in a starter mode and a generator mode, when the controller operates in the starter mode, the non-transitory memory is configured to store instructions that enable the processor to control the multiphase inverter according to a target rotation speed, and when the controller operates in the generator mode, the non-transitory memory is configured to store instructions that enable the processor to control the multiphase inverter according to a target DC link voltage.

12. The controller of claim 11, wherein the multiphase induction motor is a 9-phase induction motor and the multiphase inverter is a 9-phase inverter, and when the controller operates in the starter mode, the non-transitory memory is configured to store instructions that enable the processor to control the 9-phase inverter to supply nine third harmonic currents to the 9-phase induction motor which generates six magnetic poles.

13. The controller of claim 11, wherein the multiphase induction motor is a 9-phase induction motor and the multiphase inverter is a 9-phase inverter, and when the controller operates in the generator mode, the non-transitory memory is configured to store instructions that enable the processor to control the 9-phase inverter to supply nine first harmonic currents to the 9-phase induction motor which generates two magnetic poles.

14. A method for controlling a multiphase inverter that supplies power to a multiphase induction motor, the method comprising:

detecting a plurality of currents that flow between the multiphase inverter and the multiphase induction motor;

converting the plurality of currents into a direct-axis (d-axis) current value $I_d$ and a quadrature-axis (q-axis) current value $I_q$ in a rotating reference system;

generating a d-axis voltage command value $V^*_d$ and a q-axis voltage command value $V^*_q$ based on the d-axis current value $I_d$ and the q-axis current value $I_q$;

converting the d-axis voltage command value $V^*_d$ and the q-axis voltage command value $V^*_q$ into a plurality of command voltages;

converting the plurality of command voltages to the plurality of control voltages; and applying the plurality of control voltages to the multiphase inverter, wherein the multiphase induction motor is an n-phase induction motor, with n being an integer that is multiple of 3, and converting the plurality of currents into a direct-axis (d-axis) current value $I_d$ and a quadrature-axis (q-axis) current value $I_q$ in a rotating reference system includes:

project n currents $i_{p1}, i_{p2}, \ldots,$ and $i_{pn}$ onto an α-axis and a β-axis in a stationary reference system to generate an α-axis current $i_\alpha$ and a β-axis current $i_\beta$ represented by the following equation, and $$\begin{bmatrix} i_\alpha \\ i_\beta \\ 0 \end{bmatrix} = \frac{2}{n} \begin{bmatrix} \cos\left(0 \cdot \frac{P}{2} \cdot \frac{2\pi}{n}\right) & \cos\left(1 \cdot \frac{P}{2} \cdot \frac{2\pi}{n}\right) & \cos\left(2 \cdot \frac{P}{2} \cdot \frac{2\pi}{n}\right) & \ldots & \cos\left((n-1) \cdot \frac{P}{2} \cdot \frac{2\pi}{n}\right) \\ \sin\left(0 \cdot \frac{P}{2} \cdot \frac{2\pi}{n}\right) & \sin\left(1 \cdot \frac{P}{2} \cdot \frac{2\pi}{n}\right) & \sin\left(2 \cdot \frac{P}{2} \cdot \frac{2\pi}{n}\right) & \ldots & \sin\left((n-1) \cdot \frac{P}{2} \cdot \frac{2\pi}{n}\right) \\ 1 & 1 & 1 & \ldots & 1 \end{bmatrix} \cdot \begin{bmatrix} i_{p1} \\ i_{p2} \\ i_{p3} \\ \vdots \\ i_{pn} \end{bmatrix}$$

where P represents the number of poles generated in the multiphase induction motor; and project the α-axis current $i_\alpha$ and the β-axis current $i_\beta$ onto a d-axis and a q-axis of the rotating reference system to generate the d-axis current value $I_d$ and the q-axis current value $I_q$ represented by the following equation, $$\begin{bmatrix} I_d \\ I_q \end{bmatrix} = \begin{bmatrix} \sin\theta & -\cos\theta \\ \cos\theta & \sin\theta \end{bmatrix} \cdot \begin{bmatrix} i_\alpha \\ i_\beta \end{bmatrix}$$

where $\theta = \theta_0 + \omega t$, $\theta_0$ represents an angle between the q-axis and the α-axis at time 0, and ω represents a rotation speed of the n-phase induction motor.

15. The method of claim 14, wherein converting the d-axis voltage command value $V^*_d$ and the q-axis voltage command value $V^*_q$ into a plurality of command voltages includes:

convert the d-axis voltage command value $V^*_d$ and the q-axis voltage command value $V^*_q$ into n first harmonic command voltages $v^*_{p1}, v^*_{p2}, \ldots, v^*_{pn}$, based on the following equation, $$\begin{bmatrix} v^*_{p(0\cdot\frac{n}{3}+j)} \\ v^*_{p(1\cdot\frac{n}{3}+j)} \\ v^*_{p(2\cdot\frac{n}{3}+j)} \end{bmatrix} =$$

$$\frac{3}{2}\begin{bmatrix} \cos\left(\left(0\cdot\frac{n}{3}+j-1\right)\cdot\frac{2\pi}{n}\right) & \cos\left(\left(1\cdot\frac{n}{3}+j-1\right)\cdot\frac{2\pi}{n}\right) & \cos\left(\left(2\cdot\frac{n}{3}+j-1\right)\cdot\frac{2\pi}{n}\right) \\ \sin\left(\left(0\cdot\frac{n}{3}+j-1\right)\cdot\frac{2\pi}{n}\right) & \sin\left(\left(1\cdot\frac{n}{3}+j-1\right)\cdot\frac{2\pi}{n}\right) & \sin\left(\left(2\cdot\frac{n}{3}+j-1\right)\cdot\frac{2\pi}{n}\right) \\ 1 & 1 & 1 \end{bmatrix}^{-1} \cdot \begin{bmatrix} V^*_d\sin\theta' + V^*_q\cos\theta' \\ V^*_q\sin\theta' - V^*_d\cos\theta' \\ 0 \end{bmatrix}$$

where $$j = 1, 2, \ldots, l, l = \frac{n}{3},$$

and θ' is an output angle that represents a rotation angle between the q-axis and the α-axis at the time when dq to multiphase conversion is performed.

16. The method of claim 15, wherein converting the d-axis voltage command value $V^*_d$ and the q-axis voltage command value $V^*_q$ into a plurality of command voltages includes:

convert the d-axis voltage command value $V^*_d$ and the q-axis voltage command value $V^*_q$ into n other order harmonic command voltages $v^*_{p1}, v^*_{p2}, \ldots, v^*_{pn}$ that are other hand first harmonic voltages, based on the following equation, $$\begin{bmatrix} v^*_{p(1+3k)} \\ v^*_{p(2+3k)} \\ v^*_{p3(3+3k)} \end{bmatrix} = \frac{3}{2}\begin{bmatrix} 1 & \cos 120° & \cos 240° \\ 0 & \sin 120° & \sin 240° \\ 1 & 1 & 1 \end{bmatrix}^{-1} \begin{bmatrix} V^*_d\sin\theta' + V^*_q\cos\theta' \\ V^*_q\sin\theta' - V^*_d\cos\theta' \\ 0 \end{bmatrix}$$

where $$= 0, 1, \ldots, \frac{n}{3} - 1,$$

and θ' is an output angle that represents a rotation angle between the q-axis and the α-axis at the time when dq to multiphase conversion is performed.

17. The method of claim 14, further including:

when the multiphase induction motor operates as a starter, controlling the multiphase inverter according to a target rotation speed; and when the multiphase induction motor operates as a generator, control the multiphase inverter according to a target DC link voltage.

\* \* \* \* \*

UNITED STATES PATENT AND TRADEMARK OFFICE
CERTIFICATE OF CORRECTION

PATENT NO. : 9,571,024 B1
APPLICATION NO. : 14/987987
DATED : February 14, 2017
INVENTOR(S) : Yuan et al.

It is certified that error appears in the above-identified patent and that said Letters Patent is hereby corrected as shown below:

Column 23, Line 14, In Claim 10, delete "value and" and insert -- value $V^*_d$ and --.

Column 26, Line 20, In Claim 16, delete "= 0, 1, ... , n/3 -1," and insert -- "k= 0, 1, ... , n/3 -1, --.

Signed and Sealed this
Twenty-third Day of May, 2017

Michelle K. Lee
*Director of the United States Patent and Trademark Office*